United States Patent
Yu (10) Patent No.: US 11,632,586 B2
(45) Date of Patent: Apr. 18, 2023

(54) METHOD FOR PLACING DELIVERY INFORMATION, ELECTRONIC DEVICE, AND STORAGE MEDIUM

(71) Applicant: BEIJING DAJIA INTERNET INFORMATION TECHNOLOGY CO., LTD., Beijing (CN)

(72) Inventor: Chengyuan Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/881,834

(22) Filed: Aug. 5, 2022

(65) Prior Publication Data

US 2023/0047049 A1 Feb. 16, 2023

(30) Foreign Application Priority Data

Aug. 11, 2021 (CN) .......................... 202110920421.6

(51) Int. Cl.
*H04N 21/44* (2011.01)
*G06F 16/783* (2019.01)

(52) U.S. Cl.
CPC ..... *H04N 21/44008* (2013.01); *G06F 16/783* (2019.01)

(58) Field of Classification Search
CPC .................. H04N 21/44008; G06F 16/783
See application file for complete search history.

(56) References Cited

U.S. PATENT DOCUMENTS

| | | | |
|---|---|---|---|
| 2013/0028512 A1* | 1/2013 | Fahn | G06F 16/783 382/165 |
| 2013/0266292 A1* | 10/2013 | Sandrew | H04N 9/79 386/282 |
| 2014/0259048 A1 | 9/2014 | Brueck et al. | |
| 2015/0143414 A1 | 5/2015 | Bentolila et al. | |

(Continued)

FOREIGN PATENT DOCUMENTS

| CN | 104715023 A | 6/2015 |
|---|---|---|
| CN | 107305557 A | 10/2017 |

(Continued)

OTHER PUBLICATIONS

Junqing; Yu, et al.; Extracting Key Frames from Video Based on Text and Image Information; Sep. 2002 (3 pages).

(Continued)

*Primary Examiner* — Sunghyoun Park
(74) *Attorney, Agent, or Firm* — Reising Ethington, P.C.

(57) ABSTRACT

The present disclosure relates to a method for placing delivery information, an electronic device and a storage medium. The method includes: dividing a candidate video for placing the delivery information into a plurality of video frames; determining a plurality of key frames from the plurality of video frames based on a correlation degree of every two adjacent video frames; determining a target frame from the plurality of key frames based on existing conversion information corresponding to each of the plurality of key frames and sampling conversion information corresponding to the each of the plurality of key frames; and placing a delivery component corresponding to the target frame into the target delivery frame.

20 Claims, 6 Drawing Sheets

(56) References Cited

U.S. PATENT DOCUMENTS

| | | | |
|---|---|---|---|
| 2015/0370875 A1* | 12/2015 | Chupeau | H04N 21/83 |
| | | | 707/756 |
| 2019/0191152 A1* | 6/2019 | Xiong | H04N 21/23418 |
| 2019/0238907 A1 | 8/2019 | Xu et al. | |
| 2020/0104859 A1 | 4/2020 | Eklund | |

FOREIGN PATENT DOCUMENTS

| | | | |
|---|---|---|---|
| CN | 109495780 A | 3/2019 |
| CN | 109922379 A | 6/2019 |
| CN | 110163066 A | 8/2019 |
| CN | 110490660 A | 11/2019 |
| CN | 111601116 A | 8/2020 |
| CN | 111723713 A | 9/2020 |
| CN | 111915370 A | 11/2020 |
| CN | 112699787 A | 4/2021 |
| CN | 112883782 A | 6/2021 |
| CN | 113038268 A | 6/2021 |

OTHER PUBLICATIONS

Sun; Dong, et al.; Application of AI-Based Style Transfer Algorithm in Animation Special Effects Design; Jan. 15, 2008 (5 pages).

Choi; Kang-Sun, et al.; Motion Estimation for Stereoscopic Video and its Application to Frame Rate Up-Conversion for 3-D TV; IEEE International Conference on Consumer Electronics; 2012 (2 pages).

CN Office Action for CN Application No. 202110920421.6 dated Sep. 17, 2021, (6 pages).

English Translation—CN Office Action for CN Application No. 202110920421.6 dated Sep. 17, 2021, (6 pages).

CN Notice of Allowance for CN Application No. 202110920421.6 dated Oct. 24, 2021, (5 pages).

English Translation—CN Notice of Allowance No. 202110920421.6 dated Oct. 24, 2021, (2 pages).

Extended European Search Report for European Application No. 22189964.4-1208 dated Jan. 4, 2023 (6 pages).

\* cited by examiner

First terminal 110          Second terminal 120

METHOD FOR PLACING DELIVERY INFORMATION, ELECTRONIC DEVICE, AND STORAGE MEDIUM

CROSS-REFERENCE TO RELATED APPLICATION

This application claims priority under 35 U.S.C. § 119 to Chinese Patent Application No. 202110920421.6, filed on Aug. 11, 2021, in the China National Intellectual Property Administration, the entire contents of which are incorporated herein by reference.

TECHNICAL FIELD

The present disclosure relates to the field of information processing technology and, in particular, to a method for placing delivery information, an electronic device, and a storage medium.

BACKGROUND

With the development of network technology and video technology, information flow products in User Generated Content (UGC) scenario are emerging, and short video is one of the representatives. In the short video scenario, in addition to publishing information, users also have the demand for placing delivery information. The hot issue in the field of short video has been how to undertake the user's demand well, present the delivery information to the users of the short video in a suitable way, and complete the conversion without upsetting the user experience.

In the related art, when placing delivery information, the information delivery component is generally placed and displayed at a fixed moment in the process of placing delivery information. For example, a delivery component is placed and displayed at a predetermined point in time after the video for placing delivery information starts to play. However, displaying the delivery component at a fixed moment may affect the user's browsing experience of the delivery information details, and thus affect the conversion rate of the delivery information.

SUMMARY

The present disclosure provides a method for placing delivery information, an electronic device, and a storage medium.

According to some embodiments of the present disclosure, there is provided a method for placing delivery information, including: dividing a candidate video for placing the delivery information into a plurality of video frames; determining a plurality of key frames from the plurality of video frames based on a correlation degree of every two adjacent video frames; determining a target frame from the plurality of key frames based on existing conversion information corresponding to each of the plurality of key frames and sampling conversion information corresponding to the each of the plurality of key frames; and placing a delivery component corresponding to the target frame into the target frame.

According to some embodiments of the present disclosure, there is provided an electronic device, including a processor and a memory storing instructions executable by the processor. The processor is configured to execute the instructions to implement the method for placing delivery information as described above.

According to some embodiments of the present disclosure, there is provided a non-transitory computer-readable storage medium that, when instructions in the computer-readable storage medium are executed by a processor of a server, enables the server to perform the method for placing delivery information as described above.

It should be understood that the above general description and the following detailed description are merely exemplary and explanatory, and cannot limit the present disclosure.

BRIEF DESCRIPTION OF THE DRAWINGS

The accompanying drawings herein, incorporated into and form part of the specification, illustrate embodiments consistent with the present disclosure, and are used with the specification to explain the principles of the present disclosure, and do not constitute an undue limitation of the present disclosure.

DETAILED DESCRIPTION

In order to enable those of ordinary skill in the art to better understand the technical solutions of the present disclosure, the technical solutions in the embodiments of the present disclosure will be clearly and completely described below in conjunction with the accompanying drawings.

It should be noted that the terms "first", "second", etc. in the specification, claims and the above accompanying drawings of the present disclosure are used to distinguish similar objects and not necessarily used to describe a particular order or sequence. It should be understood that the term so used may be interchanged, where appropriate, so that embodiments of the present disclosure described herein can be implemented in an order other than those illustrated or described herein. The implementations described in the following exemplary embodiments do not represent all embodiments that are consistent with the present disclosure. Rather, they are only examples of devices and methods that are consistent with some aspects of the present disclosure, as detailed in the appended claims.

Figure 1:
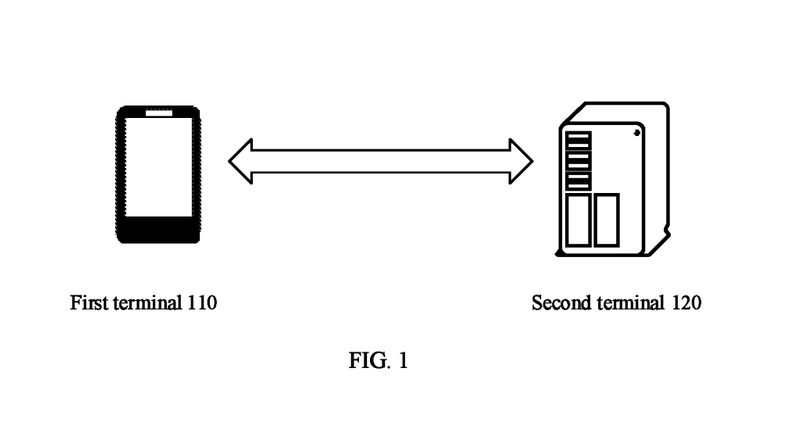
FIG. 1 is a schematic diagram of an implementation environment illustrated according to some embodiments.

Referring to FIG. 1, which illustrates a schematic diagram of an implementation environment provided by embodiments of the present disclosure, the implementation environment may include: at least one first terminal 110 and at least one second terminal 120, the first terminal 110 and the second terminal 120 may communicate data via a network.

In particular, taking the short video scenario as an example, the first terminal 110 may display the video for placing delivery information that corresponds to the information delivery goal, and the second terminal 120 may place the delivery component corresponding to the information delivery goal when the video reaches the target frame. The second terminal 120 may send the video and the corresponding delivery component together to the first terminal 110, and set the first terminal 110 to display the delivery component when the video reaches the target frame. Alternatively, the second terminal 120 first sends the video to the first terminal 110, and may then send the delivery component to the terminal 110 when the video reaches the target frame at the first terminal 110, and the first terminal 110 displays the delivery component accordingly.

The first terminal 110 may communicate with the second terminal 120 based on a Browser/Server (B/S) mode or a Client/Server (C/S) mode. The first terminal 110 may include: a physical device of the type of a smartphone, a tablet, a laptop, a digital assistant, a smart wearable, an in-vehicle terminal, etc., and may also include software running in the physical device, such as an application, etc. The operating system running on the first terminal 110 in embodiments of the present disclosure may include, but is not limited to, android, iOS, Linux, windows, etc.

The second terminal 120 and the first terminal 110 may establish a communication connection via wired or wireless. The second terminal 120 may include a stand-alone operating server, or a distributed server, or a server cluster including multiple servers, where the server may be a cloud-based server.

Figure 2:
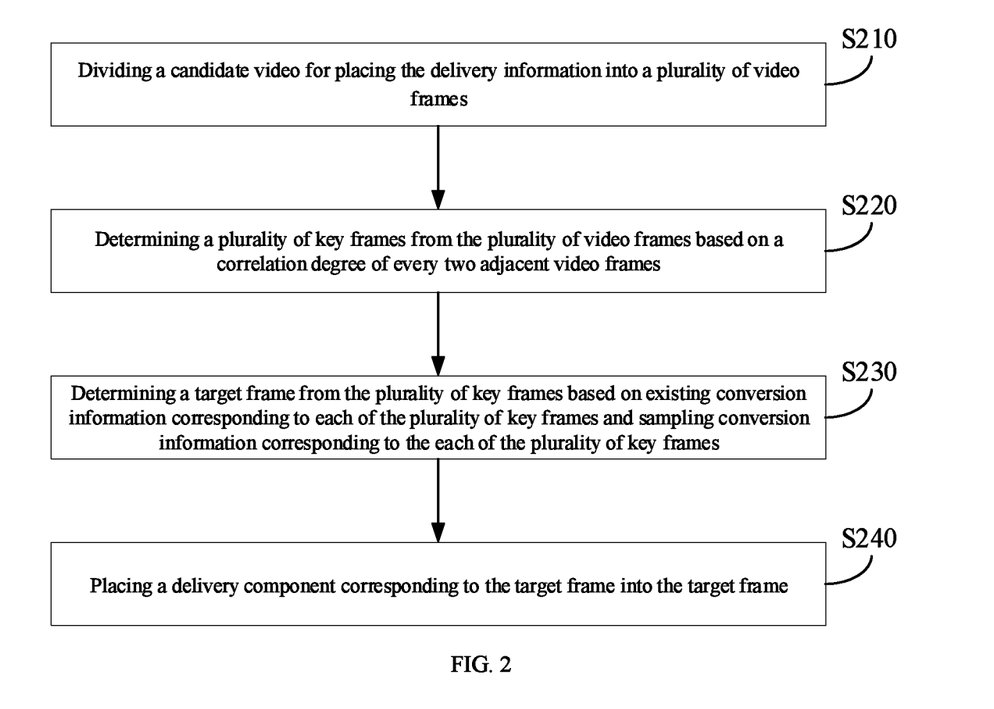
FIG. 2 is a flowchart of a method for placing delivery information illustrated according to some embodiments.

In order to solve the problem in the related art of displaying the delivery component at a fixed moment resulting in a poor user experience and thus affecting the conversion rate of the delivery information, a method for placing delivery information is provided, as shown in FIG. 2, which may include the following steps S210, S220, S230, and S240.

S210, dividing a candidate video for placing the delivery information into a plurality of video frames.

In the embodiments of present disclosure, the candidate video may refer to a video to which the delivery information corresponding to the information delivery goal is placed. The delivery information corresponding to the information delivery goal may include, in addition to a video, information such as delivery components, delivery copywriters, etc. The candidate video may be presented to the user first in the form of a short video, and when the delivery video is played to at a certain point in time, the corresponding delivery component may be displayed for the user to convert. When the user performs conversion based on the delivery component, the corresponding delivery copywriter information may also be displayed to the user for the user to further understand the details of the delivery information.

Here, the candidate video may be divided into a plurality of video frames that are consecutive in time sequence, i.e. if the candidate video can be divided into video frame 1, video frame 2 . . . video frame N, the corresponding playback order is video frame 1, video frame 2 . . . video frame N when the candidate video is played.

S220, determining a plurality of key frames from the plurality of video frames based on a correlation degree of every two adjacent video frames.

Two adjacent video frames in the present disclosure may refer to two video frames that are adjacent in time sequence, i.e., two video frames that are adjacent in playback order when the delivery video is played. The correlation degree herein for two adjacent video frames may be determined specifically based on the pixel values of the two adjacent video frames.

Figure 3:
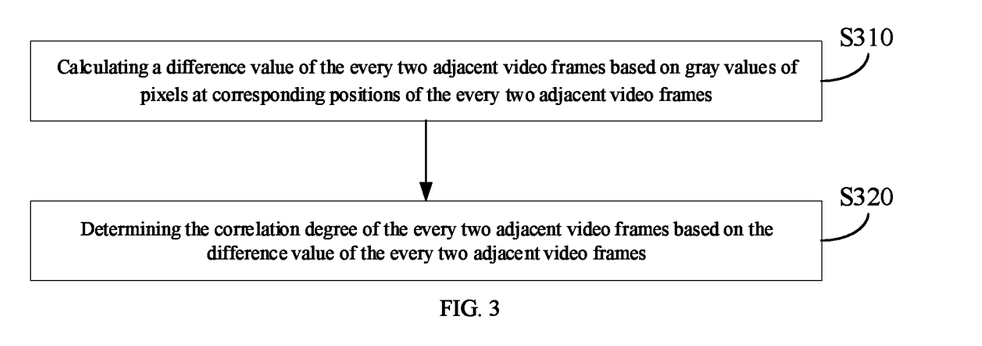
FIG. 3 is a flowchart of a method for calculating a correlation degree between video frames illustrated according to some embodiments.

Referring specifically to FIG. 3, which illustrates a method of calculating a correlation degree between video frames, the method may include the following steps S310 and S320.

S310, calculating a difference value of every two adjacent video frames based on gray values of pixels at corresponding positions of every two adjacent video frames.

S320, determining the correlation degree of every two adjacent video frames based on the difference value of every two adjacent video frames.

In specifically determining the two adjacent video frames, a plurality of video frames may be grouped to obtain a plurality of groups of video frames based on the playback order of the plurality of video frames in the candidate video; and each group of video frames includes two adjacent video frames. It should be noted that, except for the first video frame and the last video frame in the candidate video, each of the other video frames will be assigned into two groups of video frames. For example, video frame 3, which is adjacent to video frame 2, will be assigned into the same video frame group as video frame 2, and it is also adjacent to video frame 4, which will be assigned into the same video frame group as video frame 4. For a color image, each pixel in the color image corresponds to a pixel value R/G/B, and the pixel value corresponding to each pixel may be converted to a corresponding gray value. The gray value in the gray image ranges from 0 to 255, and the conversion method for the gray value may include as follows.

1. Floating point algorithm: Gray=R*0.3+G*0.59+B*0.11 R=G=B.
2. Integer method: Gray=(R*30+G*59+B*11)/100 R=G=B.
3. Shift method: Gray=(R*28+G*151+B*77)>>8 R=G=B.
4. Average method: Gray=(R+G+B)/3 R=G=B.
5. Take green only: Gray=G R=G=B.

In the specific case of the conversion for the gray value, one of the five methods mentioned above can be used, so that the gray value of each pixel in each video frame can be obtained by calculation.

In the case of grouping the plurality of video frames, specifically, each video frame is taken as a base video frame, and the base video frame and the subsequent video frame adjacent to the base video frame are assigned into one video frame group. For the above example, the following video frame groups may be obtained: [video frame 1, video frame 2], [video frame 2, video frame 3], [video frame 3, video frame 4] . . . [video frame N−1, video frame N].

The calculation of difference value can be performed for two video frames in each video frame group. Specifically, the difference between the gray values of the two video frames at the corresponding pixel is calculated and changed into an absolute value, and then normalized. The difference value of the two video frames is obtained based on the normalization results corresponding to all pixels.

The difference value of the two video frames can be used to characterize the different information of the two video frames. The larger the difference value is, the smaller the corresponding correlation degree is; and the smaller the difference value is, the larger the corresponding correlation degree is, i.e., the difference value and the correlation degree are negatively correlated, such that after obtaining the difference value of the two video frames, the correlation degree of the two video frames can be obtained by taking the reciprocal of the difference value.

Since the pixels are the basic units that make up an image, the gray values of pixels in the image can directly reflect the pixel feature information, in the present disclosure, calculating the correlation degree of two video frames based on the gray values of the pixels in the video frames can, on the one hand, improve the accuracy of the calculation of the correlation degree because the gray values can reflect the feature information of the video frames, and on the other hand, improve the convenience of the calculation of the correlation degree because the pixel values in the video frames are easily accessible.

Figure 4:
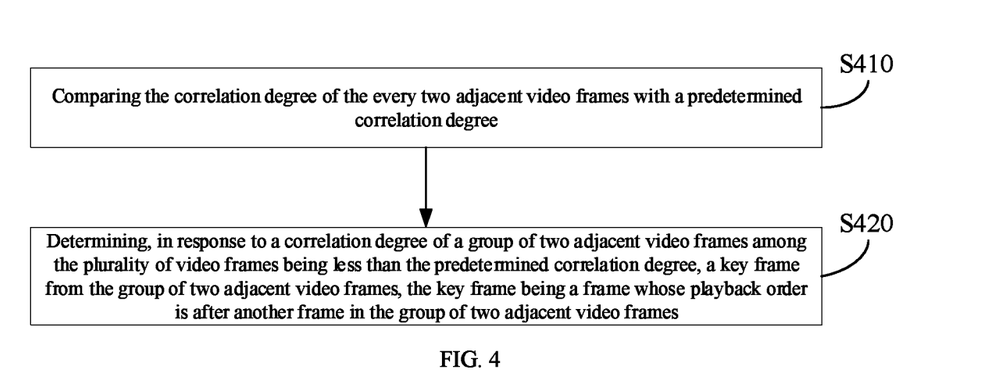
FIG. 4 is a flowchart of a method for determining a key frame illustrated according to some embodiments.

In the present disclosure, the smaller the correlation degree of two adjacent video frames is, the greater the difference between the two video frames is, and the former video frame and the latter video frame may correspond to different scenes, i.e., there may be a switch of scenes, such that these video frames for which there may be a switch of scenes need to be selected. Referring to FIG. 4, which illustrates a method for determining a key frame, the method includes the following steps S410 and S420.

S410, comparing the correlation degree of every two adjacent video frames with a predetermined correlation degree.

S420, determining, in response to a correlation degree of a group of two adjacent video frames among the plurality of video frames being less than the predetermined correlation degree, a key frame from the group of two adjacent video frames, the key frame being a frame whose playback order is after another frame in the group of two adjacent video frames.

The key frame is determined in order to find out from the plurality of video frames the one video frame that has changed significantly from its previous video frame. Specifically, the calculated correlation degree corresponding to each video frame group above may be compared with the predetermined correlation degree to obtain one or more groups of key video frames, the correlation degree corresponding to a group of key video frames is less than the predetermined correlation degree, and the video frame in the group of the key video frames with a later playback order is determined as the key frame. When the number of key frames determined based on the predetermined correlation degree is greater than the upper limit of the number of key frames, the predetermined correlation degree is adjustable to a smaller extent; when the number of key frames determined based on the predetermined correlation degree is less than the lower limit of the number of key frames, the predetermined correlation degree is adjustable to a larger extent.

The key frame herein represents, in a sense, the scene feature information of a continuous time period, i.e., a plurality of video frames following the key frame may correspond to the same scene, and thus it is not necessary to process every video frame, but only one representative frame is selected from the plurality of video frames corresponding to the same scene, thereby reducing the amount of data processing of video frames and improving the data processing efficiency. Accordingly, the key frame is determined based on the correlation degree of two adjacent video frames, which improves the accuracy of key frame determination; and the value of the predetermined correlation degree can be dynamically adjusted based on the desired number of key frames, which improves the flexibility of key frame determination.

S230, determining a target frame from the plurality of key frames based on existing conversion information corresponding to each of the plurality of key frames and sampling conversion information corresponding to the each of the plurality of key frames.

The target frame in the present disclosure may be a key frame with the highest historical conversion rate, i.e., during historical processes of placing the delivery information corresponding to the information delivery goal, the conversion rate is highest when the candidate video played by the user reaches the target frame.

Figure 5:
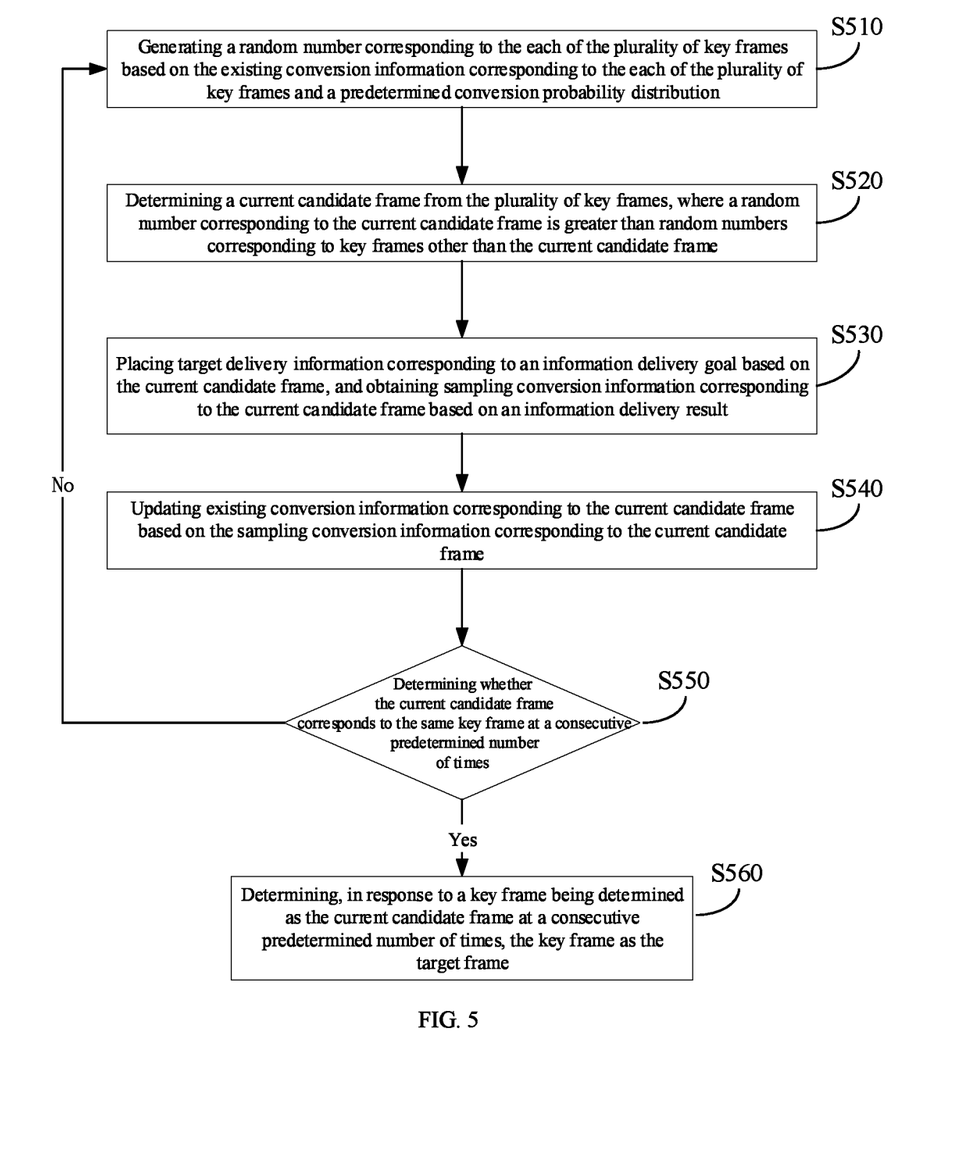
FIG. 5 is a flowchart of a method for determining a target frame illustrated according to some embodiments.

Regarding a method of determining the target frame, please refer to FIG. 5, which illustrates the method for determining the target frame. The method may include the following steps S510, S520, S530, S540, S550, and S560.

S510, generating a random number corresponding to the each of the plurality of key frames based on the existing conversion information corresponding to the each of the plurality of key frames and a predetermined conversion probability distribution.

S520, determining a current candidate frame from the plurality of key frames, where a random number corresponding to the current candidate frame is greater than random numbers corresponding to key frames other than the current candidate frame.

S530, placing target delivery information corresponding to an information delivery goal based on the current candidate frame, and obtaining sampling conversion information corresponding to the current candidate frame based on an information delivery result.

S540, updating existing conversion information corresponding to the current candidate frame based on the sampling conversion information corresponding to the current candidate frame.

S550, determining whether the current candidate frame corresponds to the same key frame at a consecutive predetermined number of times; if yes, performing step S560; if not, performing step S510.

S560, determining, in response to a key frame being determined as the current candidate frame at a consecutive predetermined number of times, the key frame as the target frame.

The predetermined conversion probability distribution here can be a Beta distribution, and the corresponding sampling process for the conversion information may use a Thompson sampling algorithm. The Beta distribution is shown as follows.

$$f(x, a, b) = \frac{1}{B(a, b)} x^{a-1} (1-x)^{b-1}. \tag{1}$$

In the scenario of placing the delivery information, the parameter "a" in the Beta distribution can be referred as the number of conversions by the user after exposure to the delivery information, and the parameter "b" in the Beta distribution can be referred as the number of unconverted times after exposure to the delivery information, such that each round of the sampling process includes the following steps.

1. The parameters "a" and "b" corresponding to each key frame may be determined based on the existing conversion information corresponding to each key frame.

2. The parameters "a" and "b" corresponding to each key frame are substituted into the Beta distribution, and the random number corresponding to each key frame is obtained based on the Beta distribution of the already substituted parameters.

3. The random numbers corresponding to all key frames are sorted, and the key frame corresponding to the largest random number is determined as a candidate frame in current round.

4. When the candidate video plays to the candidate frame of the current round, the delivery information corresponding to the information delivery goal is placed, and the sampling conversion information of the current round is determined based on whether the user converts the delivery information.

The above process is repeated until the determined candidate frames converge to the same key frame, where the judgment condition for convergence may be that the candidate frames determined by a consecutive predetermined number of times are the same key frame, and then this key frame may be determined as the target frame.

The method for determining the target frame based on the Thompson sampling process enables to continuously update the conversion information corresponding to each key frame based on the sampling process of the conversion information, and since the conversion information is determined based on user behavior, this enables to determine target frame based on the existing conversion information to be adapted to the user's preferences and enhance the user experience.

S240, placing a delivery component corresponding to the target frame into the target frame.

Figure 6:
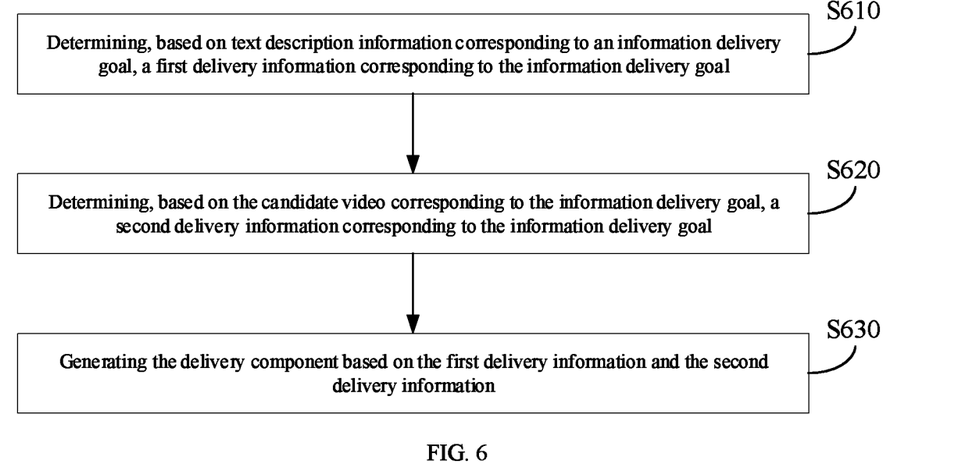
FIG. 6 is a flowchart of a method for extracting information illustrated according to some embodiments.

The delivery component in the present disclosure is displayed when the candidate video is played to the target frame during the process of placing delivery information. The delivery component may include information related to the introduction of placing delivery information, the conversion link, etc., and the user may, based on the delivery component, perform conversion accordingly. The generation of the delivery component may be performed by target recognition and information extraction of material information related to the to-be-placed delivery information uploaded by the user. Referring to FIG. 6, which illustrates a method for extracting information, the method may include the following steps S610, S620, and S630.

S610, determining, based on text description information corresponding to an information delivery goal, a first delivery information corresponding to the information delivery goal.

Here, the text description information corresponding to the information delivery goal can reflect intention of the user for placing delivery information. For example, the text description information may include the tag information selected by the user when uploading the material information. For example, the tag information may include industry information, conversion goals; the industry information may include e-commerce industry, game industry, education industry, travel industry, automobile industry, etc.; and the conversion goals may include download promotion, product purchase, consultation, etc. In addition, the text description information may also include the relevant copywriter introduction information, specifically the text introduction information of the to-be-placed delivery information, etc. Thus, by extracting such text information, the first delivery information corresponding to the delivery goal can be obtained.

S620, determining, based on the candidate video corresponding to the information delivery goal, a second delivery information corresponding to the information delivery goal.

The candidate video may include voice, text, and image information. The second delivery information corresponding to the information delivery goal can be obtained by extracting the information in the candidate video using a target recognition method.

S630, generating the delivery component based on the first delivery information and the second delivery information.

Both the first delivery information and the second delivery information contain information corresponding to the information delivery goal, and taking the delivery goal as download promotion, for example, the corresponding delivery component may specifically include an APP name, APP description information, an APP icon and an APP download click button. The APP name, APP description information and APP icon can be directly obtained from the first delivery information and the second delivery information. For the APP download click button, it may be generated based on the link information in the first delivery information or the second delivery information. The link information can be directly linked to the installation package download address of the corresponding APP, or linked to the corresponding application market.

The intention for placing delivery information can be obtained by analyzation through the target recognition of material information, from which the corresponding conversion information can be automatically extracted, and thus the user of short video only need to upload the promoted content, such as commodity purchase page, app download link, offline lead address, etc., the platform side extracts the promotion content through programmatic means based on the video understanding ability, without the need to manually configure the delivery information, which improves the efficiency of information delivery.

Figure 7:
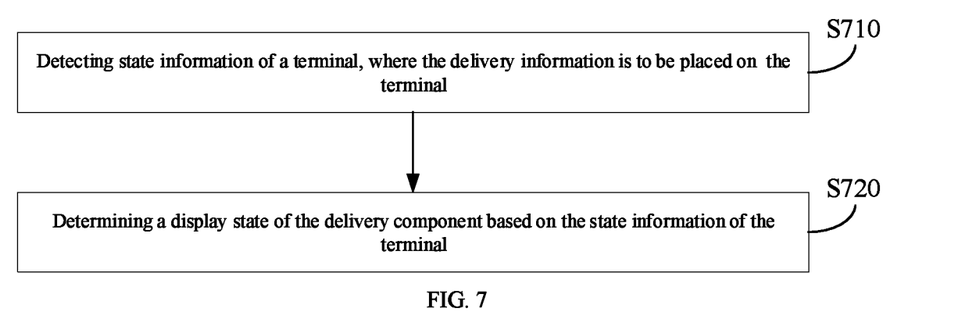
FIG. 7 is a flowchart of a method for determining a component display state illustrated according to some embodiments.

Referring to FIG. 7, which illustrated a method for determining a component display state, the method may include the following steps S710, and S720.

S710, detecting state information of a terminal, where the delivery information is to be placed on the terminal.

S720, determining a display state of the delivery component based on the state information of the terminal.

The display state of the delivery component may refer to the display state of the delivery component on the display interface when placing the delivery information on the terminal. The display state may be used to characterize the information on the progress status of the to-be-placed delivery information or the description information of the to-be-placed delivery information. The corresponding state information may be different for different terminals, so that when delivery information is placed, a corresponding delivery component can be generated in real time based on the state information of the terminal, and the display state of the delivery component can be adjusted adaptively to achieve a personalized component display.

Figure 8:
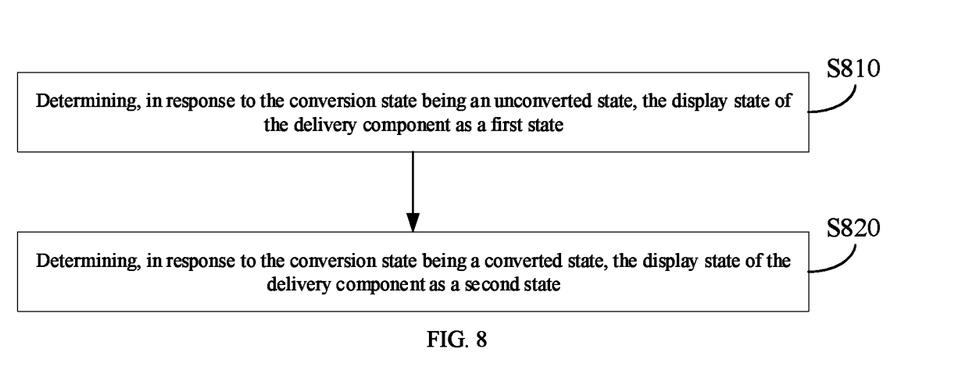
FIG. 8 is a flowchart of another method for determining a component display state illustrated according to some embodiments.

The state information of the terminal may be a conversion state for the information delivery goal. Referring to FIG. 8, which illustrates another method for determining the component display state, the method may include the following steps S810, and S820.

S810, determining, in response to the conversion state being an unconverted state, the display state of the delivery component as a first state.

S820, determining, in response to the conversion state being a converted state, the display state of the delivery component as a second state.

In a specific implementation, when the state information of the terminal, on which the delivery information is to be placed, is an unconverted state, the first state of the corresponding delivery component may be a state that a conversion is achievable; when the state information of the terminal is a converted state, the second state of the corresponding delivery component may be a state that the one associated with the conversion is achievable.

Taking the delivery goal being APP download promotion as an example, the unconverted state may refer to that the terminal, on which the delivery information is to be placed, is detected as not having downloaded the target APP's installation package, and the text information at the APP download click button of the delivery component can be "Download Now", which is the first state; the converted state may refer to that the terminal is detected as having downloaded the target APP's installation package but not having installed it, and the text information at the APP download click button of the delivery component can be "Install Now", which is the second state; or the converted state may refer to that the terminal is detected as having downloaded the target APP's installation package and having installed it, and the text information at the APP download click button of the delivery component can be "Go to use", which is the second state.

By determining the display state of the delivery component based on the conversion state of the information delivery goal for the terminal on which the delivery information is to be placed, targeted and diversified display of components can be realized to achieve personalized information delivery and component display, in addition, to avoid repeated delivery of delivery component and improve user experience.

Figure 9:
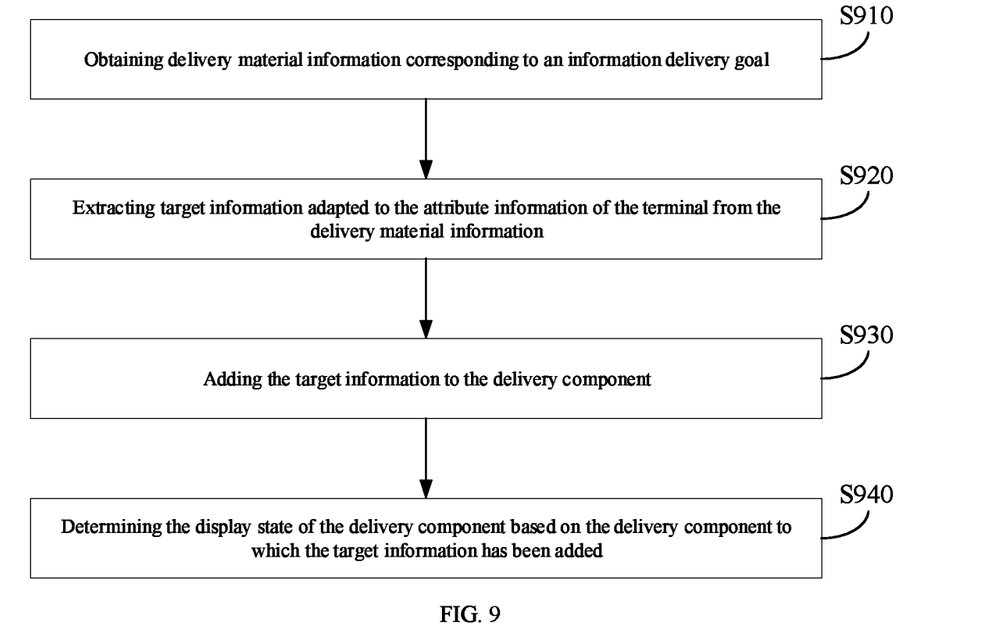
FIG. 9 is a flowchart of yet another method for determining a component display state illustrated according to some embodiments.

When the state information of the terminal on which the delivery information is to be placed is attribute information of the terminal, the method may include the following steps S910, S920, S930, and S940. Referring to FIG. 9, it illustrates yet another method for determining the component display state.

S910, obtaining delivery material information corresponding to an information delivery goal.

S920, extracting target information adapted to the attribute information of the terminal from the delivery material information.

S930, adding the target information to the delivery component.

S940, determining the display state of the delivery component based on the delivery component to which the target information has been added.

The attribute information here may include location information of the terminal, operating system information of the terminal, etc. The terminal in different states may have different conversion modes for the same information delivery goal, which may be distinguished by the display state of the displayed delivery component.

Taking the state information of the terminal as the location information of the terminal as an example for illustration, if the information delivery goal is traffic diversion & consultation, due to the particularity of the information delivery goal, offline services may be required. Therefore, when the delivery information is placed, it is necessary to consider the influence of the current location information of the user on the information delivery goal for conversion, where the delivery information is to be placed to the user; when placing the delivery information limited by geographic location information, services near the location of the terminal can be pushed to the terminal, for example, the location information of the terminal can be obtained in real time to recommend local services to the terminal.

Since the attribute information of different terminals is different, a delivery component adapted to the corresponding attribute information can be displayed for the same information delivery goal, thus the delivery component states of different terminals are different, so that the user can obtain the corresponding information through the corresponding delivery component, realizing personalization and diversity of placing delivery information.

In the present disclosure, the candidate video is divided into a plurality of video frames, and a plurality of key frames are determined from the plurality of video frames based on the correlation degree of adjacent video frames; the target frame is determined from the plurality of key frames based on the existing conversion information corresponding to each of the plurality of key frames and the sampling conversion information corresponding to the each of the plurality of key frames; and the delivery component corresponding to the target frame is placed into the target frame. In the present disclosure, the target frame is determined from a plurality of video frames corresponding to the candidate video, and when the candidate video is played to the target frame in the process of placing delivery information, the delivery component corresponding to the information delivery goal is placed. Since the target frame is determined based on the conversion information of each key frame in the present disclosure, i.e., the conversion situation corresponding to each key frame is taken into account, thus the conversion rate of the delivery information can be improved and the degradation of user experience caused by displaying the delivery component at a fixed moment can be avoided. At the same time, the display time of the corresponding delivery component during different processes of placing delivery information can be set adaptively based on the conversion rate information corresponding to different candidate videos, which improves the flexibility of placing the delivery information.

Figure 10:
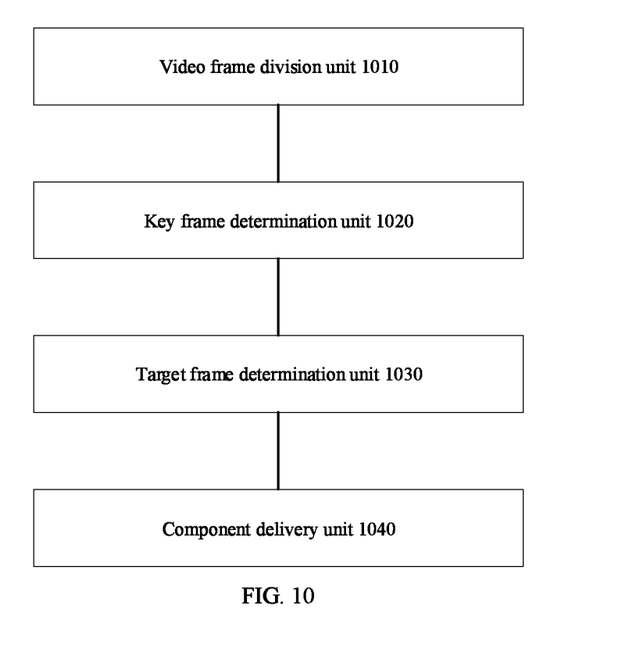
FIG. 10 is a block diagram of an apparatus for placing delivery information illustrated according to some embodiments.

FIG. 10 is a block diagram of an apparatus for placing delivery information illustrated according to some embodiments. The apparatus includes: a video frame division unit 1010 configured to divide a candidate video into a plurality of video frames; a key frame determination unit 1020 configured to determine a plurality of key frames from the plurality of video frames based on a correlation degree of every two adjacent video frames; a target frame determination unit 1030 configured to determine a target frame from the plurality of key frames based on existing conversion information corresponding to each of the plurality of key frames and sampling conversion information corresponding to the each of the plurality of key frames; and a component delivery unit 1040 configured to place a delivery component corresponding to the target frame into the target frame.

In some embodiments, the apparatus further includes: a difference value calculation unit configured to calculate a difference value of every two adjacent video frames based on gray values of pixels at corresponding positions of every two adjacent video frames; and a correlation degree determination unit configured to determine the correlation degree of every two adjacent video frames based on the difference value of every two adjacent video frames.

In some embodiments, the key frame determination unit 1020 includes a correlation degree comparison unit configured to compare the correlation degree of every two adjacent video frames with a predetermined correlation degree; and a first determination unit configured to determine, in response to a correlation degree of a group of two adjacent video frames among the plurality of video frames being less than the predetermined correlation degree, a key frame from the group of two adjacent video frames, the key frame being a frame whose playback order is after another frame in the group of two adjacent video frames.

In some embodiments, the target frame determination unit 1030 includes a repeat execution unit configured to execute following steps repeatedly: a random number generation unit configured to generate a random number corresponding to the each of the plurality of key frames based on the existing conversion information corresponding to the each of the plurality of key frames and a predetermined conversion probability distribution; a candidate frame determination unit configured to determine a current candidate frame from the plurality of key frames, where a random number corresponding to the current candidate frame is greater than random numbers corresponding to key frames other than the current candidate frame; a sampling conversion information generation unit configured to place delivery information corresponding to an information delivery goal based on the current candidate frame, and obtain sampling conversion information corresponding to the current candidate frame based on an information delivery result; an update unit configured to update existing conversion information corresponding to the current candidate frame based on the sampling conversion information corresponding to the current candidate frame; and a second determination unit configured to determine, in response to a key frame being determined as the current candidate frame at a consecutive predetermined number of times, the key frame as the target frame.

In some embodiments, the apparatus further includes a first delivery information determination unit configured to determine, based on text description information corresponding to an information delivery goal, a first delivery information corresponding to the information delivery goal; a second delivery information determination unit configured to determine, based on the candidate video corresponding to the information delivery goal, a second delivery information corresponding to the information delivery goal; and a delivery component generation unit configured to generate the delivery component based on the first delivery information and the second delivery information.

In some embodiments, the apparatus further includes a state detection unit configured to detect state information of a terminal, where the delivery information is to be placed on the terminal; and a display state determination unit configured to determine a display state of the delivery component based on the state information of the terminal.

In some embodiments, the state information of the terminal is attribute information of the terminal. The display state determination unit includes a material information obtaining unit configured to obtain delivery material information corresponding to an information delivery goal; a target information extraction unit configured to extract target information adapted to the attribute information of the terminal from the delivery material information; a target information addition unit configured to add the target information to the delivery component; and a third determination unit configured to determine the display state of the delivery component based on the delivery component to which the target information has been added.

With respect to the apparatus in the above-described embodiments, the specific manner in which the individual modules perform their operations has been described in detail in the embodiments relating to the method, and will not be described in detail herein.

In exemplary embodiments, there is also provided a computer-readable storage medium including instructions. Optionally, the computer-readable storage medium may be ROM, random access memory (RAM), CD-ROM, magnetic tape, floppy disk, and optical data storage device, among others, enabling the server to perform any one method as described above when the instructions in the computer-readable storage medium are executed by a processor of the server.

Figure 11:
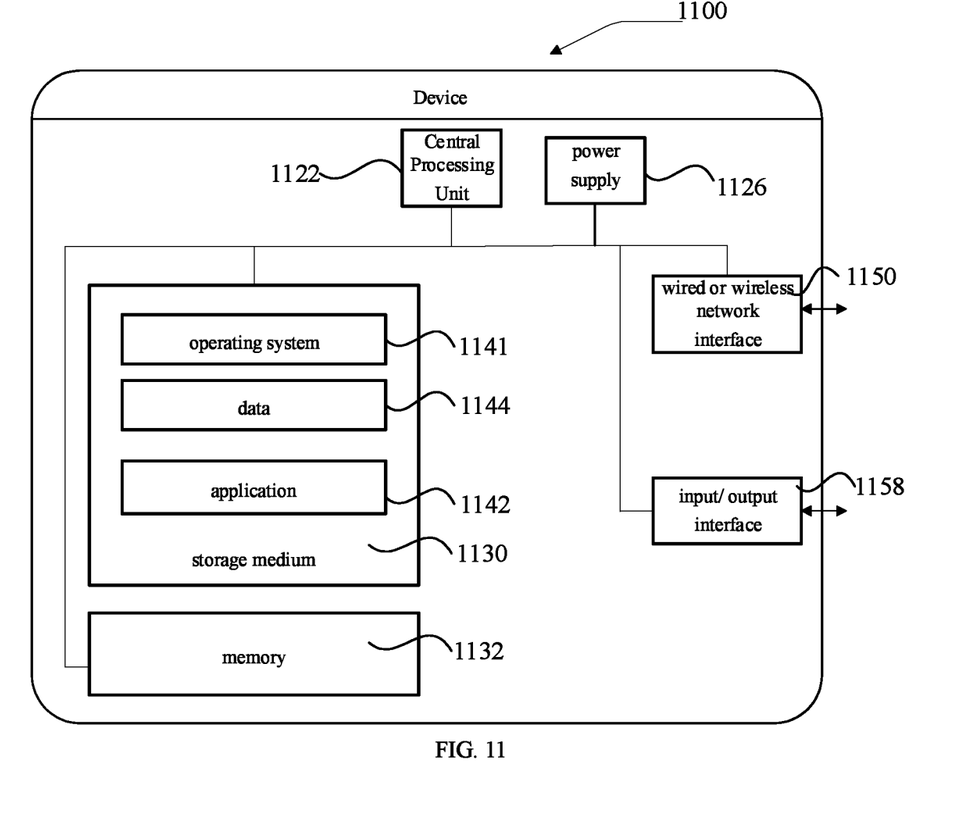
FIG. 11 is a structural schematic diagram of a device illustrated according to some embodiments.

The embodiments of the present disclosure further provide a device, the structure of which is illustrated in FIG. 11. The device 1100 may vary relatively widely in configuration or performance, and may include one or more central processing units (CPUs) 1122 (e.g., one or more processors) and memory 1132, one or more storage media 1130 (e.g., one or more mass storage devices) that stores applications 1142 or data 1144. Memory 1132 and storage media 1130 may be ephemeral storage or persistent storage. The program stored in the storage media 1130 may include one or more modules (not shown), each of which may include a series of instructions for operation in the device. Further, the central processor 1122 may be set up to communicate with the storage media 1130 to execute a series of instruction operations in the storage media 1130 on the device 1100. The device 1100 may also include one or more power supplies 1126, one or more wired or wireless network interfaces 1150, one or more input and output interfaces 1158, and/or, one or more operating systems 1141, such as Windows Server™, Mac OSX™, Unix™, Linux™, FreeBSD™, etc. Any of the above method of the embodiments may be implemented based on the device shown in FIG. 11.

Those skilled in the art can easily think of other implementation solutions of the present disclosure after considering the specification and practicing the content disclosed herein. The present disclosure is intended to cover any variations, purposes or applicable changes of the present disclosure following the general principles thereof and including common knowledge or commonly used technical means in the technical field which are not disclosed herein. The specification and embodiments merely considered as illustrative, and the true scope and spirit of the present disclosure are pointed out by the claims.

What is claimed is:

1. A method for placing delivery information, comprising:
    dividing a candidate video for placing the delivery information into a plurality of video frames;
    determining a plurality of key frames from the plurality of video frames based on a correlation degree of every two adjacent video frames;
    determining a target frame from the plurality of key frames based on existing conversion information corresponding to each of the plurality of key frames and sampling conversion information corresponding to the each of the plurality of key frames, wherein the target frame is a key frame with a highest historical conversion rate; and
    placing a delivery component corresponding to the target frame into the target frame.

2. The method of claim 1, further comprising:
    calculating a difference value of every two adjacent video frames based on gray values of pixels at corresponding positions of every two adjacent video frames; and
    determining the correlation degree of every two adjacent video frames based on the difference value of every two adjacent video frames.

3. The method of claim 2, wherein said determining a plurality of key frames from the plurality of video frames based on a correlation degree of every two adjacent video frames, comprises:
- comparing the correlation degree of every two adjacent video frames with a predetermined correlation degree; and
- determining, in response to a correlation degree of a group of two adjacent video frames among the plurality of video frames being less than the predetermined correlation degree, a key frame from the group of two adjacent video frames, the key frame being a frame whose playback order is after another frame in the group of two adjacent video frames.

4. The method of claim 1, wherein said determining a target frame from the plurality of key frames based on existing conversion information corresponding to each of the plurality of key frames and sampling conversion information corresponding to the each of the plurality of key frames, comprises:
- repeating following steps:
  - generating a random number corresponding to the each of the plurality of key frames based on the existing conversion information corresponding to the each of the plurality of key frames and a predetermined conversion probability distribution;
  - determining a current candidate frame from the plurality of key frames, wherein a random number corresponding to the current candidate frame is greater than random numbers corresponding to key frames other than the current candidate frame;
  - placing target delivery information corresponding to an information delivery goal based on the current candidate frame, and obtaining sampling conversion information corresponding to the current candidate frame based on an information delivery result;
  - updating existing conversion information corresponding to the current candidate frame based on the sampling conversion information corresponding to the current candidate frame; and
  - determining, in response to a key frame being determined as the current candidate frame at a consecutive predetermined number of times, the key frame as the target frame.

5. The method of claim 1, further comprising:
- determining, based on text description information corresponding to an information delivery goal, a first delivery information corresponding to the information delivery goal;
- determining, based on the candidate video corresponding to the information delivery goal, a second delivery information corresponding to the information delivery goal; and
- generating the delivery component based on the first delivery information and the second delivery information.

6. The method of claim 1, further comprising:
- detecting state information of a terminal, wherein the delivery information is to be placed on the terminal; and
- determining a display state of the delivery component based on the state information of the terminal.

7. The method of claim 6, wherein the state information of the terminal is attribute information of the terminal; and
- wherein said determining a display state of the delivery component based on the state information of the terminal, comprises:
  - obtaining delivery material information corresponding to an information delivery goal;
  - extracting target information adapted to the attribute information of the terminal from the delivery material information;
  - adding the target information to the delivery component; and
  - determining the display state of the delivery component based on the delivery component to which the target information has been added.

8. An electronic device, comprising:
- a processor; and
- a memory storing instructions executable by the processor;
- wherein the processor is configured to execute the instructions to implement acts comprising:
  - dividing a candidate video for placing delivery information into a plurality of video frames;
  - determining a plurality of key frames from the plurality of video frames based on a correlation degree of every two adjacent video frames;
  - determining a target frame from the plurality of key frames based on existing conversion information corresponding to each of the plurality of key frames and sampling conversion information corresponding to the each of the plurality of key frames, wherein the target frame is a key frame with a highest historical conversion rate; and
  - placing a delivery component corresponding to the target frame into the target frame.

9. The electronic device of claim 8, wherein the processor is further configured to:
- calculate a difference value of every two adjacent video frames based on gray values of pixels at corresponding positions of every two adjacent video frames; and
- determine the correlation degree of every two adjacent video frames based on the difference value of every two adjacent video frames.

10. The electronic device of claim 9, wherein the processor is further configured to:
- compare the correlation degree of every two adjacent video frames with a predetermined correlation degree; and
- determine, in response to a correlation degree of a group of two adjacent video frames among the plurality of video frames being less than the predetermined correlation degree, a key frame from the group of two adjacent video frames, the key frame being a frame whose playback order is after another frame in the group of two adjacent video frames.

11. The electronic device of claim 8, wherein the processor is configured to determine the target frame by repeating following acts:
- generating a random number corresponding to the each of the plurality of key frames based on the existing conversion information corresponding to the each of the plurality of key frames and a predetermined conversion probability distribution;
- determining a current candidate frame from the plurality of key frames, wherein a random number corresponding to the current candidate frame is greater than random numbers corresponding to key frames other than the current candidate frame;
- placing target delivery information corresponding to an information delivery goal based on the current candidate frame, and obtaining sampling conversion information corresponding to the current candidate frame based on an information delivery result;

updating existing conversion information corresponding to the current candidate frame based on the sampling conversion information corresponding to the current candidate frame; and determining, in response to a key frame being determined as the current candidate frame at a consecutive predetermined number of times, the key frame as the target frame.

12. The electronic device of claim 8, wherein the processor is further configured to:

determine, based on text description information corresponding to an information delivery goal, a first delivery information corresponding to the information delivery goal;

determine, based on the candidate video corresponding to the information delivery goal, a second delivery information corresponding to the information delivery goal; and generate the delivery component based on the first delivery information and the second delivery information.

13. The electronic device of claim 8, wherein the processor is further configured to:

detect state information of a terminal, wherein the delivery information is to be placed on the terminal; and determine a display state of the delivery component based on the state information of the terminal.

14. The electronic device of claim 13, wherein the state information of the terminal is attribute information of the terminal; and wherein the processor is further configured to:

obtain delivery material information corresponding to an information delivery goal;

extract target information adapted to the attribute information of the terminal from the delivery material information;

add the target information to the delivery component; and determine the display state of the delivery component based on the delivery component to which the target information has been added.

15. A non-transitory computer-readable storage medium, wherein when instructions in the computer-readable storage medium are executed by a processor of an electronic device, enabling the electronic device to perform acts comprising:

dividing a candidate video for placing delivery information into a plurality of video frames;

determining a plurality of key frames from the plurality of video frames based on a correlation degree of every two adjacent video frames;

determining a target frame from the plurality of key frames based on existing conversion information corresponding to each of the plurality of key frames and sampling conversion information corresponding to the each of the plurality of key frames, wherein the target frame is a key frame with a highest historical conversion rate; and placing a delivery component corresponding to the target frame into the target frame.

16. The storage medium of claim 15, wherein the acts further comprise:

calculating a difference value of every two adjacent video frames based on gray values of pixels at corresponding positions of every two adjacent video frames; and determining the correlation degree of every two adjacent video frames based on the difference value of every two adjacent video frames.

17. The storage medium of claim 16, wherein said determining a plurality of key frames from the plurality of video frames based on a correlation degree of every two adjacent video frames, comprises:

comparing the correlation degree of every two adjacent video frames with a predetermined correlation degree; and determining, in response to a correlation degree of a group of two adjacent video frames among the plurality of video frames being less than the predetermined correlation degree, a key frame from the group of two adjacent video frames, the key frame being a frame whose playback order is after another frame in the group of two adjacent video frames.

18. The storage medium of claim 15, wherein said determining a target frame from the plurality of key frames based on existing conversion information corresponding to each of the plurality of key frames and sampling conversion information corresponding to the each of the plurality of key frames, comprises:

repeating following steps:

generating a random number corresponding to the each of the plurality of key frames based on the existing conversion information corresponding to the each of the plurality of key frames and a predetermined conversion probability distribution;

determining a current candidate frame from the plurality of key frames, wherein a random number corresponding to the current candidate frame is greater than random numbers corresponding to key frames other than the current candidate frame;

placing target delivery information corresponding to an information delivery goal based on the current candidate frame, and obtaining sampling conversion information corresponding to the current candidate frame based on an information delivery result;

updating existing conversion information corresponding to the current candidate frame based on the sampling conversion information corresponding to the current candidate frame; and determining, in response to a key frame being determined as the current candidate frame at a consecutive predetermined number of times, the key frame as the target frame.

19. The storage medium of claim 15, wherein the acts further comprise:

determining, based on text description information corresponding to an information delivery goal, a first delivery information corresponding to the information delivery goal;

determining, based on the candidate video corresponding to the information delivery goal, a second delivery information corresponding to the information delivery goal; and generating the delivery component based on the first delivery information and the second delivery information.

20. The storage medium of claim 15, wherein the acts further comprise:

detecting state information of a terminal, wherein the delivery information is to be placed on the terminal; and determining a display state of the delivery component based on the state information of the terminal.

* * * * *